Figure 1:
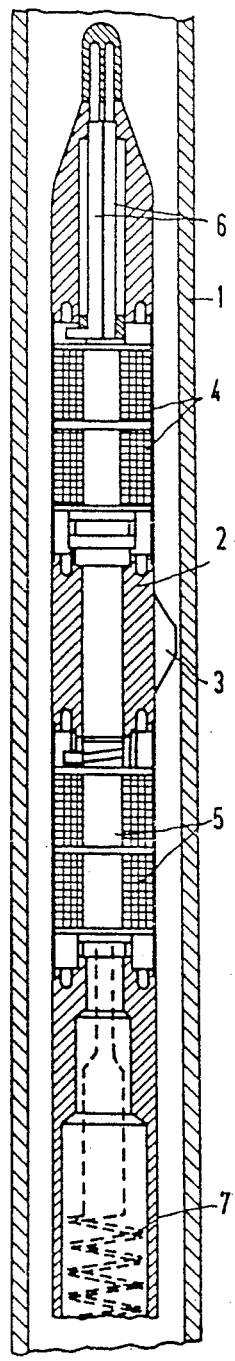

United States Patent [19]

Knaak

[11] Patent Number: 4,958,523

[45] Date of Patent: Sep. 25, 1990

[54] APPARATUS FOR MEASURING THE FLOW RATE OF ELECTRICALLY CONDUCTIVE LIQUIDS

[75] Inventor: Joachim Knaak, Bergisch Gladbach, Fed. Rep. of Germany

[73] Assignee: Interatom GmbH, Bergisch Gladbach, Fed. Rep. of Germany

[21] Appl. No.: 364,813

[22] Filed: Jun. 9, 1989

[30] Foreign Application Priority Data

Jun. 21, 1988 [DE] Fed. Rep. of Germany ....... 3820936

[51] Int. Cl.[5] ...................... G01F 1/58; G21C 17/032
[52] U.S. Cl. .................................. 73/861.11; 73/198; 324/445; 376/246
[58] Field of Search ................. 73/861.11, 198, 861.08; 324/204, 445; 376/246

[56] References Cited

U.S. PATENT DOCUMENTS

| | | |
|---|---|---|
| 2,435,043 | 1/1948 | Lehde et al. . |
| 3,922,192 | 11/1975 | Duncombe et al. ......... 73/861.11 X |
| 3,940,996 | 3/1976 | Lauhoff et al. .................... 73/198 X |
| 3,987,362 | 10/1976 | McCann et al. . |
| 4,144,741 | 3/1979 | Nakamoto et al. ............. 324/204 X |
| 4,622,202 | 11/1986 | Yamada et al. ............. 73/861.11 X |

FOREIGN PATENT DOCUMENTS 2120523  5/1984  Fed. Rep. of Germany

*Primary Examiner*—Charles A. Ruehl
*Attorney, Agent, or Firm*—Herbert L. Lerner; Laurence A. Greenberg

[57] ABSTRACT

An apparatus for measuring the flow rate of electrically conductive liquids includes two coils disposed in succession as seen in the flow direction of a liquid. The coils are switched in alternation as a primary and a secondary coil. One of the coils is excited with an alternating current as the primary coil, and voltage induced by the excitation in the other of the coils as the secondary coil is measured.

8 Claims, 1 Drawing Sheet

APPARATUS FOR MEASURING THE FLOW RATE OF ELECTRICALLY CONDUCTIVE LIQUIDS

The invention relates to an apparatus for measuring the flow rate of electrically conductive liquids by means of coils disposed in succession in the flow direction, one of the coils being excitable with an alternating current as the primary coil, and the voltage thereby induced in secondary coils being measurable.

Such an apparatus is particularly suitable for monitoring the flow of liquid metal (such as sodium) used as a coolant in some nuclear installations. A reduction in this flow caused by deposits in lines carrying the liquid metal, or resulting from other damage in the system, must be recognized with certainty if subsequent damage to the system, for instance from local overheating, is to be avoided.

However, the apparatus according to the invention can also be used advantageously in the metal casting industry.

U.S. Pat. No. 2,435,043 discloses a method for measuring the flow rate of electrically conductive liquids, in which at least three induction coils are placed parallel to the flow on the same magnetic axis, and in which the first and third coils are excited by the application of an alternating voltage in such a manner that their magnetic influence on the second coil is cancelled out mutually when the flow is in repose. In that method, the electrically conductive liquid flowing past the coils causes a distortion of the magnetic fields of the first and third coils in such a way that a voltage that is directly proportional to the flow rate is induced in the second coil as a result. A modification of an apparatus which is suitable for this method and with which the temperature and any bubble content in the liquid can be measured at the same time, has been described in German Patent No. DE-PS 21 20 523 C2, corresponding to U.S. Pat. No. 3,940,996. Since the differential voltage obtained between the first and third coils in that device is dependent on the temperature of the liquid to be measured, a calibration must be made in order to obtain an absolute value for the flow rate.

In practice, it has been found that actually manufacturing the first and third coils entirely identically presents great problems. Because of the dissimilarities, a differential signal is produced even when the liquid is at rest, and this differential signal must likewise be compensated for as a function of time. Experience has also shown that over relatively long use in a hot and possibly radioactively exposed environment, the coils exhibit signs of aging, which can also falsify the measurement signal. Since it is very expensive to replace aged coils in nuclear facilities, and this can only be done at relatively long time intervals, there is a need for a measuring apparatus that is reliable over long periods of time.

It is accordingly an object of the invention to provide an apparatus for measuring the flow rate of electrically conductive liquids, which overcomes the hereinafore-mentioned disadvantages of the heretofore-known devices of this general type, in which the so-called offset signal resulting from the dissimilarity of the coils becomes negligibly small and independent of time, in which the temperature dependency itself can be corrected by selecting a suitable operating frequency, and furthermore in which the circuit required for evaluating the measurement signal can be simplified.

With the foregoing and other objects in view there is provided, in accordance with the invention, an apparatus for measuring the flow rate of electrically conductive liquids, comprising only two coils disposed in succession as seen in flow direction of a liquid, means for switching the coils in alternation as a primary and a secondary coil, means for exciting one of the coils with an alternating current as the primary coil, and means for measuring voltage induced by the excitation in the other of the coils as the secondary coil.

Reducing the number of coils to two is a characteristic that already favorably influences both the dimensions to be accommodated and the costs of the apparatus. If the first coil facing into the flow is connected as a primary coil, then a signal increased in accordance with the flow rate of the liquid is generated in the second downstream coil. If the apparatus is wired in such a manner that the first coil is connected as the secondary coil and the second coil is connected as the primary coil, then a correspondingly reduced signal is generated. The difference between these two voltages is then a standard for the flow rate, but in this case only a coupling inductance between the two coils becomes operative and is of equal magnitude regardless of how the coils are connected. The offset signal becomes very low, and the effects of aging and the like, known as drift, become negligible. Although on one hand the apparatus itself becomes more complex because a device must be provided that assures a periodic switch-over between the two coils, on the other hand only one calibration (which is independent of temperature) of the zero point offset needs to be performed.

In accordance with another feature of the invention, the exciter current has a frequency making the induction voltages to be measured substantially independent of the temperature of the liquid.

In accordance with a further feature of the invention, the coils are switched periodically in accordance with a clock frequency, for determining a voltage difference.

In accordance with an added feature of the invention, the exciter frequency is an integral multiple of the clock frequency.

In accordance with an additional feature of the invention, there is provided an amplifier for amplifying the induction voltages of the coils prior to a difference formation, and a switch system connecting the amplifier to the coils.

In accordance with yet another feature of the invention, there is provided a band pass filter connected downstream of the amplifier, In accordance with yet a further feature of the invention, the mean frequency of the band pass filter is automatically adapted to the frequency of the exciter current.

In accordance with a concomitant feature of the invention, there are provided two settable current sources for alternating current of constant amplitude each being connected to a respective one of the coils for operation as a primary coil, and a common oscillator for the frequency of the exciter current for driving the current sources.

Other features which are considered as characteristic for the invention are set forth in the appended claims.

Although the invention is illustrated and described herein as embodied in an apparatus for measuring the flow rate of electrically conductive liquids, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
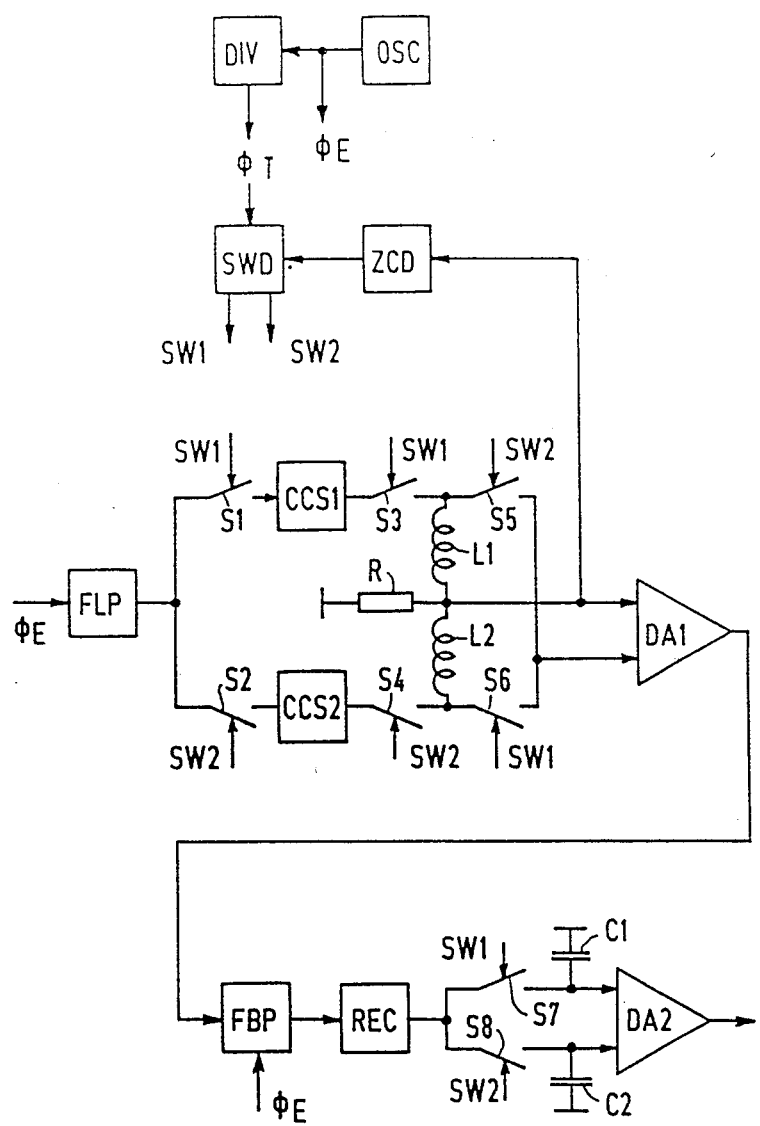

FIG. 1 is a fragmentary, diagrammatic, axial longitudinal sectional view of the apparatus according to the invention; and FIG. 2 is a schematic and block circuit diagram of a circuit suitable for operating the apparatus.

Referring now to the figures of the drawing in detail and first, particularly, to FIG. 1 thereof, there is seen a sensor body 2 that is centrally guided by means of cams 3 which are distributed about the circumference thereof. The sensor body 2 is disposed inside a tube 1 that plunges into the liquid to be monitored Disposed inside the sensor body 2 are a first coil 4 and a second coil 5, which are coupled together in a manner to be described below. Thermocouple elements 6 are disposed in the sensor head, for measuring the temperature of the liquid at a given time. The signals of the thermocouple elements 6 and the coils 4, 5 are supplied to an evaluation circuit shown in FIG. 2, through lines 7.

As shown in FIG. 2, each of two coils L1, L2 is operated as a primary coil, through its own respective current source CCS1, CCS2 for alternating current of constant amplitude and a specifiable frequency. The current sources are supplied at the inputs thereof with a sine-wave signal from a system clock signal phi$_E$ obtained, for instance, by means of a low pass filter FLP. The coils L1, L2 alternatingly switch over as primary and secondary coils, wherein the output of the coil which is the primary coil at a given time is connected to the current source associated with it, and the secondary coil at the given time is connected to one input of an amplifier DA1. The switchover is effected with a system of preferably electronically controllable switches S1, S2, S3, S4, S5 and S6, which are opened and closed by control signals SW1, SW2 from a control unit SWD. The switches S1, S3 and S6 controlled by the signal SW1 are intended to be closed precisely when the switches S2, S4 and S5 controlled by the signal SW2 are open, and vice versa.

The operation of the control unit SWD is effected with a clock signal phi$_T$, the frequency of which is equivalent to an integral fraction of the frequency of the signal phi$_E$, and preferably is generated from the signal phi$_E$ in a frequency divider DIV which is connected to an oscillator OSC.

In order to provide protection for the current sources CCS1 and CCS2 and the amplifier DA1, a zero passage detector ZCD can be inserted into the circuit. The output signal of the zero passage detector ZCD is supplied to the control unit SWD to enable the control unit to effect a switchover only when the current through the primary coil L1 or L2, which is equivalent to the voltage drop over a resistor R connected in series with the primary coil, is below a threshold value. In this way, self-induction voltages that might occur are limited to an amount that is safe for the current sources CCS1, CCS2 and the amplifier DA1.

In order to eliminate any interference signals that might be present, it is advantageous to place a band pass filter FBP downstream of the output of the amplifier DA1, preferably a band pass filter of the type that adjusts automatically to the frequency of the coil current which is supplied with the clock signal phi$_E$ as a mean frequency of the band width. The automatic follow-up of the mean frequency avoids influencing the measurement signals as a function of the transmission characteristic of the filter FBP, which would occur in a filter with a fixed mean frequency in the event of fluctuations in the frequency of the system clock signal phi$_E$.

The output signal of the amplifier DA1, which is optionally filtered in the filter FBP, is supplied to a rectifier REC and rectified th©re. The output signal of the rectifier REC is fed through switches S7 and S8 which are driven by the signals SW1 and SW2, respectively, and reaches the inputs of a differential amplifier DA2, which are wired as integrators, for instance with capacitors Cl, C2. The differential amplifier DA2 finally furnishes the measurement variable, in the form of an output signal that is proportional to the difference between the mean values of the induction voltages which are generated in one of the coils, L1 or L2 by the magnetic field of the other coil, L2 or L1 at a given time.

The foregoing is a description corresponding in substance to German Application P 38 20 936.5, dated June 21, 1988, the International priority of which is being claimed for the instant application, and which is hereby made part of this application. Any material discrepancies between the foregoing specification and the aforementioned corresponding German application are to be resolved in favor of the latter.

I claim:

1. Apparatus for measuring the flow rate of electrically conductive liquids, comprising two coils disposed in succession as seen in the flow direction of a liquid, means for switching said coils in alternation as a primary and a secondary coil, means for exciting one of said coils with an alternating current as the primary coil, and means for measuring voltage induced by the excitation in the other of said coils as the secondary coil.

2. Apparatus according to claim 1, wherein the exciter current has a frequency making the induction voltages to be measured substantially independent of the temperature of the liquid.

3. Apparatus according to claim 2, wherein said coils are switched periodically in accordance with a clock frequency, for determining a voltage difference.

4. Apparatus according to claim 3, wherein the exciter frequency is an integral multiple of the clock frequency.

5. Apparatus according to claim 1, including an amplifier for amplifying the induction voltages of said coils prior to a difference formation, and a switch system connecting said amplifier to said coils.

6. Apparatus according to claim 5, including a band pass filter connected downstream of said amplifier.

7. Apparatus according to claim 6, wherein the mean frequency of said band pass filter is automatically controlled by the frequency of the exciter current.

8. Apparatus according to claim 1, including two settable current sources for alternating current of constant amplitude each being connected to a respective one of said coils for operation as a primary coil, and a common oscillator for the frequency of said exciter current for driving said current sources.

* * * * *